(12) United States Patent
Ogawa

(10) Patent No.: US 9,553,320 B2
(45) Date of Patent: Jan. 24, 2017

(54) FUEL CELL SYSTEM

(75) Inventor: Tetsuya Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/342,817

(22) PCT Filed: Aug. 23, 2012

(86) PCT No.: PCT/JP2012/071933
§ 371 (c)(1),
(2), (4) Date: Mar. 5, 2014

(87) PCT Pub. No.: WO2013/035607
PCT Pub. Date: Mar. 14, 2013

(65) Prior Publication Data
US 2014/0193727 A1   Jul. 10, 2014

(30) Foreign Application Priority Data

Sep. 7, 2011 (JP) .................................. 2011-194992

(51) Int. Cl.
*H01M 8/04* (2016.01)
*H01M 8/12* (2016.01)

(52) U.S. Cl.
CPC ..... *H01M 8/04164* (2013.01); *H01M 8/04007* (2013.01); *H01M 8/04373* (2013.01);
(Continued)

(58) Field of Classification Search
CPC .................... H01M 8/04164; H01M 8/04007; H01M 8/04373; H01M 8/04619; H01M 8/04761; H01M 2008/1293; H01M 2250/405; Y02E 60/50; Y02E 60/525
See application file for complete search history.

(56) References Cited

U.S. PATENT DOCUMENTS

2008/0107933 A1* 5/2008 Gallagher ........................ 429/17
2009/0181271 A1* 7/2009 Yasuda et al. ................... 429/24
(Continued)

FOREIGN PATENT DOCUMENTS

| JP | 4-280484 | 10/1992 | |
|---|---|---|---|
| JP | 4280484 | * 10/1992 | .............. H01M 8/00 |

(Continued)

OTHER PUBLICATIONS

Japanese Office Action dated Aug. 5, 2014, Application No. 2011-194992, partial English translation included.
(Continued)

*Primary Examiner* — Jonathan G Leong
*Assistant Examiner* — Seenam Agbetiafan
(74) *Attorney, Agent, or Firm* — Rankin, Hill & Clark LLP

(57) ABSTRACT

A fuel cell system includes a fuel cell module for generating electrical energy by electrochemical reactions of a fuel gas and an oxygen-containing gas, and a condenser for condensing water vapor in an exhaust gas discharged from the fuel cell module by heat exchange between the exhaust gas and a coolant to collect the condensed water and supplying the collected condensed water to the fuel cell module. The condenser includes an air cooling condensing mechanism using the oxygen-containing gas as the coolant, and a water cooling condensing mechanism using the hot water stored in the hot water storage unit as the coolant. The air cooling condensing mechanism includes a thermoelectric converter for performing thermoelectric conversion by a temperature difference between the exhaust gas and the oxygen-containing gas.

4 Claims, 11 Drawing Sheets

(52) U.S. Cl.
CPC .... *H01M 8/04619* (2013.01); *H01M 8/04761* (2013.01); *H01M 2008/1293* (2013.01); *H01M 2250/405* (2013.01); *Y02B 90/16* (2013.01); *Y02E 60/50* (2013.01); *Y02E 60/525* (2013.01)

(56) References Cited

U.S. PATENT DOCUMENTS

| | | |
|---|---|---|
| 2009/0297900 A1 | 12/2009 | Higuchi |
| 2010/0203404 A1 | 8/2010 | Miyazaki |
| 2012/0135322 A1 | 5/2012 | Yoshimine |

FOREIGN PATENT DOCUMENTS

| | | |
|---|---|---|
| JP | 2002-048004 | 2/2002 |
| JP | 2003-187843 | 7/2003 |
| JP | 2006-024430 | 1/2006 |
| JP | 2009-37871 | 2/2009 |
| JP | 2009-168275 | 7/2009 |
| JP | 2011-23168 | 2/2011 |
| WO | 2007/052633 | 5/2007 |

OTHER PUBLICATIONS

Japanese Office Action dated Aug. 5, 2014, Application No. 2011-194995, partial English translation included.
This application is co-pending with U.S. Appl. No. 14/342,821, which was filed Mar. 5, 2014.
Office Action issued Jul. 1, 2016 in co-pending U.S. Appl. No. 14/342,821.
Conversion of Unused Heat Energy to Electricity by Means of Thermoelectric Generation in Condenser, Takashi Kyono et al., IEEE Transactions on Energy Conversion, vol. 18, No. 2, Jun. 2003.

\* cited by examiner

FIG. 5

| W:ELECTRICITY \ Q:HEAT | BELOW RANGE | WITHIN RANGE | ABOVE RANGE |
|---|---|---|---|
| BELOW RANGE | A<br>↑ HEAT MODE<br>↑ ELECTRICITY MODE | B<br>→ HEAT MODE<br>↑ ELECTRICITY MODE | C<br>↓ HEAT MODE<br>↑ ELECTRICITY MODE |
| WITHIN RANGE | D<br>↑ HEAT MODE<br>→ ELECTRICITY MODE | E<br>→ HEAT MODE<br>→ ELECTRICITY MODE | F<br>↓ HEAT MODE<br>→ ELECTRICITY MODE |
| ABOVE RANGE | G<br>↑ HEAT MODE<br>↓ ELECTRICITY MODE | H<br>→ HEAT MODE<br>↓ ELECTRICITY MODE | I<br>OTHER |

FUEL CELL SYSTEM

TECHNICAL FIELD

The present invention relates to a fuel cell system including a fuel cell module for generating electrical energy by electrochemical reactions of a fuel gas and an oxygen-containing gas, and a condenser for condensing water vapor in an exhaust gas discharged from the fuel cell module by heat exchange between the exhaust gas and a coolant to collect the condensed water and supplying the collected condensed water to the fuel cell module.

BACKGROUND ART

Typically, a solid oxide fuel cell (SOFC) employs a solid electrolyte of ion-conductive oxide such as stabilized zirconia. The solid electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas produced from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, for example, to produce a reformed gas (fuel gas).

The operating temperature of the fuel cell of this type is relatively high. Therefore, the exhaust gas containing the fuel gas and the oxygen-containing gas partially consumed in the power generation reaction is hot. Thus, it is desired to effectively utilize the exhaust gas. In this regard, for example, a fuel cell system disclosed in Japanese Laid-Open Patent Publication No. 2006-024430 (hereinafter referred to as the conventional technique 1) is known.

As shown in FIG. 9, this fuel cell system includes a solid oxide fuel cell $1a$, a heat exchanger $2a$ for performing heat exchange between the exhaust gas discharged from the solid oxide fuel cell $1a$ and water, a hot water tank $3a$ for storing water, a circulation pipe $4a$ connecting the bottom of the hot water tank $3a$ and the heat exchanger $2a$ and connecting an upper portion of the hot water tank $3a$ and the heat exchanger $2a$ to circulate water between the hot water tank $3a$ and the heat exchanger $2a$, a circulation pump $5a$ provided in the circulation pipe $4a$ for forcibly circulating the water, temperature detectors $6a$, $7a$ for detecting the temperature of the water at the inlet and the outlet of the heat exchanger $2a$, and a control device $8a$ for controlling the output of the circulation pump $5a$ such that the temperature of the water at the outlet of the heat exchanger $2a$ becomes higher than the temperature of the water at the inlet of the heat exchanger $2a$ by a predetermined temperature or more.

Further in a fuel cell system disclosed in International Publication No. WO2007/052633 (hereinafter referred to as the conventional technique 2), as shown in FIG. 10, a solid oxide fuel cell $1b$, a heat exchanger $2b$ for performing heat exchange between the exhaust gas discharged from the solid oxide fuel cell $1b$ and water, a hot water tank $3b$ for storing water, a circulation pipe $4b$ for circulating the water between the hot water tank $3b$ and the heat exchanger $2b$, a circulation pump $5b$ provided in the circulation pipe $4b$, and a control device $6b$ for controlling the fuel utilization ratio during power generation of the solid oxide fuel cell $1b$ in correspondence with the amount of the used hot water are provided.

Further, in a fuel cell system and a cogeneration system disclosed in Japanese Laid-Open Patent Publication No. 2003-187843 (hereinafter referred to as the conventional technique 3), a fuel cell unit, an exhaust gas combustion unit, and a first heat exchanger unit are provided. The fuel cell unit is connected to electric loads, and generates fuel cell electrical power with the fuel gas and the oxygen-containing gas, and supplies the electrical power to the electric loads. The exhaust gas combustion unit combusts the fuel gas and the oxygen-containing gas partially consumed in the fuel gas unit to produce a combustion exhaust gas. The first heat exchanger unit collects heat from the combustion exhaust gas through a heat medium.

The fuel cell unit is operated continuously at predetermined temperature or more so that electrical power generated in the fuel cell can be supplied to the electric loads even if no electrical power is required for the electric loads. The heat is supplied to heat utilization equipment which utilizes the heat medium.

Further, in a heat/electric power cogenerating device disclosed in Japanese Laid-Open Patent Publication No. 2002-048004 (hereinafter referred to as the conventional technique 4), as shown in FIG. 11, a heat/electric power generator $1c$, an electrical energy storage device $2c$, a heat accumulator $3c$, and a control device $4c$ are provided. Electrical power generated by the heat/electric power generator $1c$ is supplied to the electrical energy storage device $2c$, and stored in the electrical energy storage device $2c$. Likewise, heat generated by the heat/electric power generator $1c$ is supplied to the heat accumulator $3c$, and stored in the heat accumulator $3c$. To a load $5c$ which requires energy, electrical power is supplied from the electrical energy storage device $2c$, and heat is supplied from the heat accumulator $3c$.

SUMMARY OF INVENTION

However, in the conventional technique 1, if the temperature of the water in the hot water tank $3a$ becomes high, supply of the hot water is stopped or supply of the exhaust gas is stopped. Therefore, the hot exhaust gas is discharged wastefully. Further, it is difficult to condense the water component in the exhaust gas to achieve perfect circulation of the water required for reforming (water self-sustaining operation).

Further, the conventional technique 2 is directed to control the fuel utilization ratio during power generation. Therefore, in the case where the hot water is fully stored in the hot water tank $3b$, or the temperature of the hot water in the hot water tank $3b$ becomes high, water self-sustaining operation and supply of the required electrical power to the loads may not be performed, and the hot water may not be maintained.

Further, the conventional technique 3 is intended to improve the energy efficiency even in the time zone when electrical power required by the loads and heat energy required by the loads are small. Therefore, in the case where the hot water is fully stored in the hot water tank, or the temperature of the hot water in the hot water tank is high, water self-sustaining operation and supply of the required electrical power to the loads may not be performed, and the hot water may not be maintained.

Further, in the conventional technique 4, the electrical energy storage device $2c$ and the heat accumulator $3c$ are provided. Therefore, the overall size of the heat/electric power cogenerating device is large. Further, it is difficult to achieve water self-sustaining operation, and achieve the thermally self-sustaining operation where the operating temperature of the fuel cell is maintained only by the heat produced within the heat/electric power cogenerating device without supplying heat from the outside.

The present invention has been made to solve the problems of this type, and an object of the present invention is to provide a fuel cell system which makes it possible to facilitate water self-sustaining operation and thermally self-sustaining operation, and achieve improvement in the power generation efficiency.

The present invention relates to a fuel cell system including a fuel cell module for generating electrical energy by electrochemical reactions of a fuel gas and an oxygen-containing gas, and a condenser for condensing water vapor in an exhaust gas discharged from the fuel cell module by heat exchange between the exhaust gas and a coolant to collect the condensed water and supplying the collected condensed water to the fuel cell module.

In the fuel cell system, the condenser includes an air cooling condensing mechanism using the oxygen-containing gas as the coolant. The air cooling condensing mechanism includes a thermoelectric converter for performing thermoelectric conversion by a temperature difference between the exhaust gas and the oxygen-containing gas.

In the present invention, the air cooling condensing mechanism includes the thermoelectric converter for performing thermoelectric conversion by the temperature difference between the exhaust gas and the oxygen-containing gas. Thus, the temperature difference (heat energy) between the exhaust gas and the oxygen-containing gas can be collected as electrical energy, and improvement in the power generation efficiency is achieved effectively.

Further, the temperature of the exhaust gas is decreased, and it becomes possible to condense the water vapor in the exhaust gas to collect the condensed water. Thus, generation of waste heat is suppressed, and water self-sustaining operation is facilitated. Further, since the temperature of the oxygen-containing gas is increased, thermally self-sustaining operation is facilitated easily.

Water self-sustaining operation herein means operation where the entire amount of water required for operating the fuel cell system is supplied within the fuel cell system, without supplying additional water from the outside. Thermally self-sustaining operation herein means operation where the entire amount of heat quantity required for operating the fuel cell system is supplied within the fuel cell system, and where the operating temperature of the fuel cell system is maintained using only heat energy generated in the fuel cell system, without supplying additional heat from the outside.

BRIEF DESCRIPTION OF DRAWINGS

FIG. 5 is a control map of the control method;

DESCRIPTION OF EMBODIMENTS

A fuel cell system 10 for carrying out a control method according to a first embodiment of the present invention is used in various applications, including stationary and mobile applications. For example, the fuel cell system 10 is mounted in a vehicle.

Figure 1:
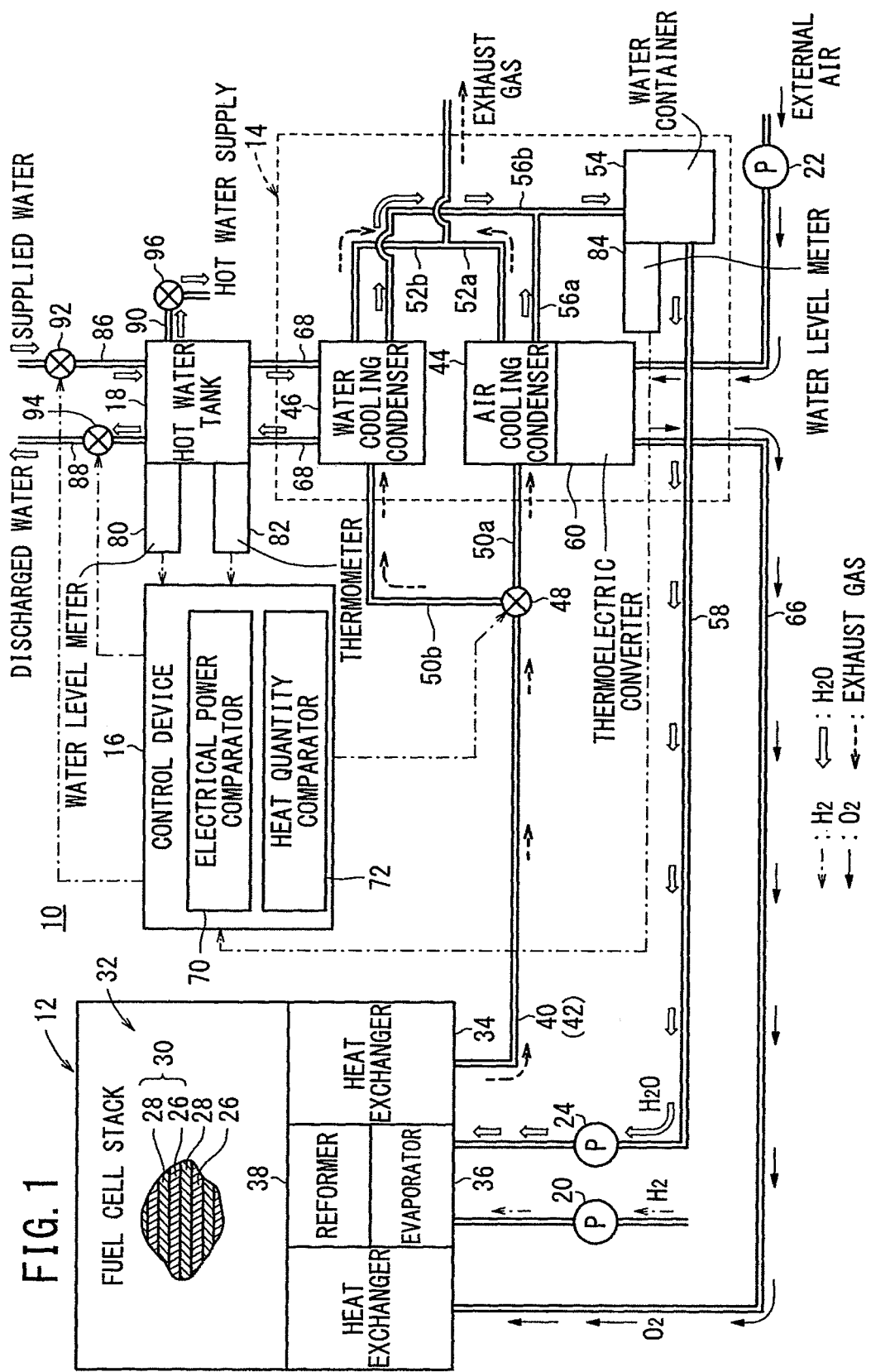
FIG. 1 is a diagram schematically showing structure of a fuel cell system for carrying out a control method according to a first embodiment of the present invention.

As schematically shown in FIG. 1, the fuel cell system 10 includes a fuel cell module 12 for generating electrical energy in power generation by electrochemical reactions of a fuel gas (hydrogen gas) and an oxygen-containing gas (air), a condenser 14 for condensing water vapor in an exhaust gas discharged from the fuel cell module 12 by heat exchange between the exhaust gas and a coolant to collect the condensed water and supplying the collected condensed water to the fuel cell module 12, a control device 16, and a hot water tank (storage unit) 18 for storing water as the coolant.

The fuel cell module 12 includes a fuel gas supply apparatus (including a fuel gas pump) 20 for supplying a raw fuel (e.g., city gas) to the fuel cell module 12, an oxygen-containing gas supply apparatus (including an air pump) 22 for supplying an oxygen-containing gas to the fuel cell module 12, and a water supply apparatus (including a water pump) 24 for supplying water to the fuel cell module 12.

The fuel cell module 12 includes a solid oxide fuel cell stack 32 formed by stacking a plurality of solid oxide fuel cells 30 in a vertical direction (or a horizontal direction). The fuel cells 30 are formed by stacking electrolyte electrode assemblies 26 and separators 28. Though not shown, each of the electrolyte electrode assemblies 26 includes a cathode, an anode, and a solid electrolyte (solid oxide) interposed between the cathode and the anode. For example, the electrolyte is made of ion-conductive solid oxide such as stabilized zirconia.

At a lower end (or an upper end) of the fuel cell stack 32 in the stacking direction, a heat exchanger 34 for heating the oxygen-containing gas before the oxygen-containing gas is supplied to the fuel cell stack 32, an evaporator 36 for evaporating water to produce a mixed fuel of a raw fuel (e.g., city gas) chiefly containing hydrocarbon and water vapor, and a reformer 38 for reforming the mixed fuel to produce a reformed gas are provided.

The reformer 38 is a preliminary reformer for reforming higher hydrocarbon ($C_{2+}$) such as ethane ($C_2H_6$), propane ($C_3H_8$), and butane ($C_4H_{10}$) in the city gas (raw fuel) into a reformed gas chiefly containing methane ($CH_4$) by steam reforming. The operating temperature of the reformer 38 is several hundred ° C.

The operating temperature of the fuel cell 30 is high, at several hundred ° C. In the electrolyte electrode assembly 26, methane in the fuel gas is reformed to obtain hydrogen, and the hydrogen is supplied to the anode.

The heat exchanger 34 induces heat exchange between the partially consumed reactant gas discharged from the fuel cell stack 32 (hereinafter also referred to as the exhaust gas or the combustion exhaust gas) and the air as the heated fluid by allowing the exhaust gas and the air to flow in a counterflow manner for heating the air. The exhaust gas after heat exchange is discharged into an exhaust gas pipe 40, and the air after heat exchange is supplied as the oxygen-containing gas to the fuel cell stack 32.

The outlet of the evaporator 36 is connected to the inlet of the reformer 38, and the outlet of the reformer 38 is connected to a fuel gas supply passage (not shown) of the fuel cell stack 32. A main exhaust gas pipe 42 is provided for discharging the exhaust gas supplied to the evaporator 36. The main exhaust gas pipe 42 is formed integrally with the exhaust gas pipe 40.

The condenser 14 includes an air cooling condenser (air cooling condensing mechanism) 44 using the oxygen-containing gas as a coolant, a water cooling condenser (water cooling condensing mechanism) 46 using hot water stored in the hot water tank 18 as a coolant. For example, each of the air cooling condenser 44 and the water cooling condenser 46 has a rectangular cylinder shape, i.e., has a rectangular shape in cross section.

A regulator valve 48 is provided in the exhaust gas pipe 40 extending from the fuel cell module 12. Exhaust gas channels 50a, 50b are branched at the outlet of the regulator valve 48. The air cooling condenser 44 is connected to the exhaust gas channel 50a, and the water cooling condenser 46 is connected to the exhaust gas channel 50b.

The regulator valve 48 can regulate the flow rate of the exhaust gas supplied to the air cooling condenser 44 and the flow rate of the exhaust gas supplied to the water cooling condenser 46 separately. The exhaust gas may be supplied only to the air cooling condenser 44, the exhaust gas may be supplied only to the water cooling condenser 46, or the exhaust gas may be supplied to both of the air cooling condenser 44 and the water cooling condenser 46 at predetermined flow rates.

The regulator valve 48 may change the flow rate of the exhaust gas distributed to the exhaust gas channel 50a, and the flow rate of the exhaust gas distributed to the exhaust gas channel 50b to regulate the flow rates of the exhaust gas supplied to the exhaust gas channels 50a, 50b. In the control described later, it is required to increase or decrease the flow rates of the exhaust gas distributed to the exhaust gas channels 50a, 50b by increasing or decreasing the output of the fuel cell module 12 to increase or decrease the amount of the supplied exhaust gas.

At the outlets of the air cooling condenser 44 and the water cooling condenser 46, exhaust gas channels 52a, 52b for discharging the exhaust gas are provided, and condensed water channels 56a, 56b for supplying the condensed water to a water container 54 are provided. The water container 54 stores the condensed water, and the water container 54 is connected to the water supply apparatus 24 through a water channel 58. After the exhaust gas channels 52a, 52b are merged, the exhaust gas channels 52a, 52b can discharge the exhaust gas to the outside of the condenser 14.

Figure 2:
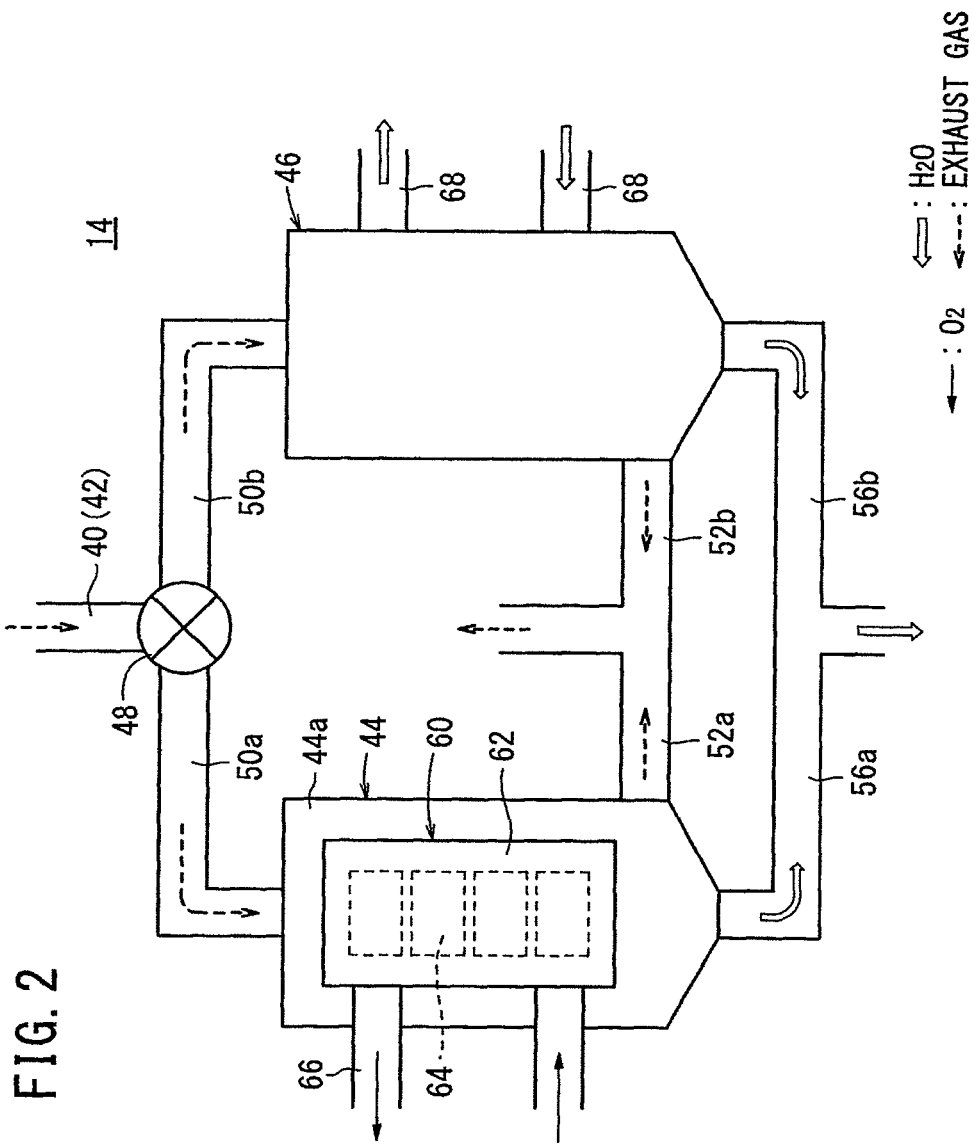
FIG. 2 is a view showing a condenser of the fuel cell system.
Figure 3:
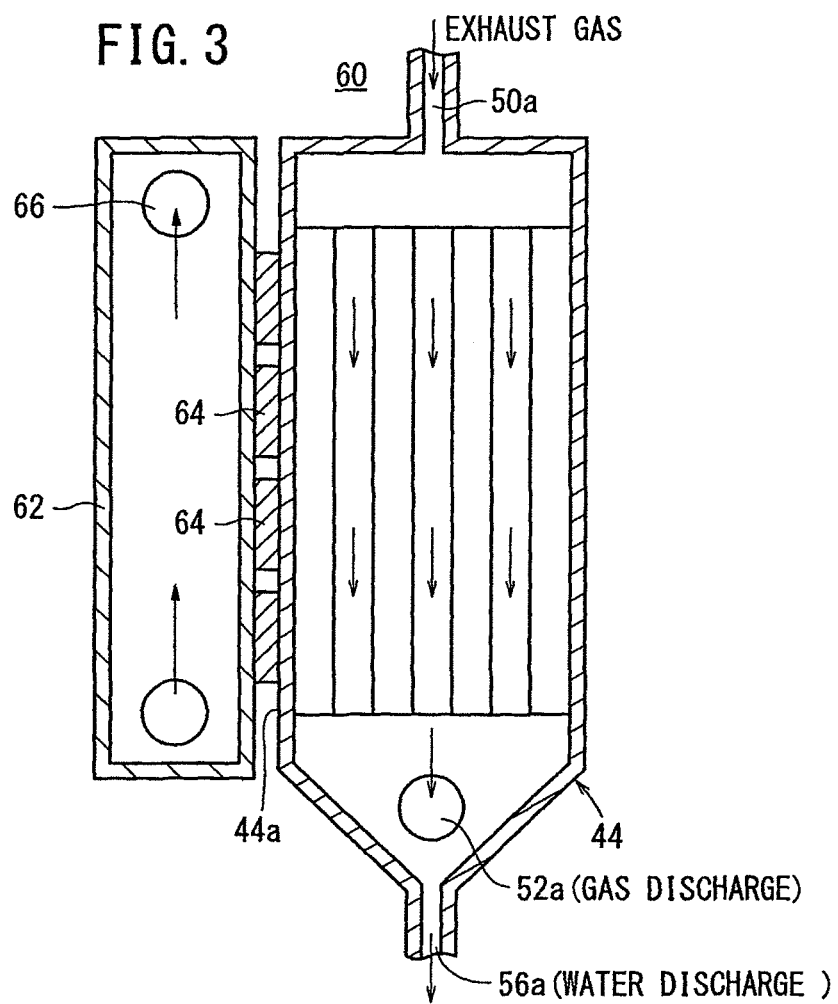
FIG. 3 is a cross sectional view showing a thermoelectric converter of the condenser.

As shown in FIGS. 2 and 3, a thermoelectric converter 60 for performing thermoelectric conversion by a temperature difference between the exhaust gas and the oxygen-containing gas is attached to the air cooling condenser 44. The thermoelectric converter 60 includes a plurality of thermoelectric conversion elements 64 attached between one flat outer surface (hot temperature side) 44a of the air cooling condenser 44 and a rectangular cylinder shaped air flow pipe (low temperature side) 62 as a passage of the air (oxygen-containing gas). As described later, the thermoelectric conversion elements 64 are capable of generating an electromotive force by generating a temperature difference between both ends.

As shown in FIGS. 1 to 3, an air supply pipe 66 is connected to the air flow pipe 62. The oxygen-containing gas supply apparatus 22 is provided at the air supply pipe 66. The oxygen-containing gas from the air supply pipe 66 is supplied as the coolant into the air flow pipe 62, and after the oxygen-containing gas is heated by heat exchange with the exhaust gas, the oxygen-containing gas is supplied to the fuel cell stack 32.

A circulation pipe 68 connected to the hot water tank 18 is provided in the water cooling condenser 46. In the circulation pipe 68, the hot water in the hot water tank 18 is supplied as the coolant into the water cooling condenser 46 for heat exchange with the exhaust gas, and the heated hot water is returned to the hot water tank 18.

The control device 16 at least includes an electrical power comparator 70 for comparing supplied electrical power (electrical energy) W with a demanded electrical power range, and a heat quantity comparator 72 for comparing supplied heat quantity Q with a predetermined demanded heat quantity range.

The hot water tank 18 includes a water level meter (hot water level detector) 80 for detecting the water level of the hot water stored in the hot water tank 18 and a thermometer (hot water temperature detector) 82 for detecting the temperature of the hot water stored in the hot water tank 18. The water container 54 includes a water level meter (condensed water level detector) 84 for detecting the water level of the condensed water in the water container 54.

A water supply pipe 86 for receiving city water supplied from the outside, a water discharge pipe 88 for discharging water, and a hot water supply pipe 90 for supplying the stored hot water at a predetermined temperature are connected to the hot water tank 18. Valves 92, 94, and 96 are provided in the water supply pipe 86, the water discharge pipe 88, and the hot water supply pipe 90, respectively.

Operation of the fuel cell system 10 will be described below.

By operation of the fuel gas supply apparatus 20, for example, a raw fuel such as the city gas (including $CH_4$, $C_2H_6$, $C_3H_8$, $C_4H_{10}$) is supplied to the evaporator 36. Further, by operation of the water supply apparatus 24, water is supplied to the evaporator 36, and by operation of the oxygen-containing gas supply apparatus 22, the oxygen-containing gas such as the air is supplied to the heat exchanger 34 through the thermoelectric converter 60.

In the evaporator 36, the raw fuel is mixed with the water vapor, and a mixed fuel is obtained. The mixed fuel is supplied to the inlet of the reformer 38. The mixed fuel undergoes steam reforming in the reformer 38. Thus, hydrocarbon of $C_{2+}$ is removed (reformed), and a reformed gas chiefly containing methane is obtained. The reformed gas flows through the outlet of the reformer 38, and the reformed gas flows into the fuel cell stack 32. Thus, the methane in the fuel gas is reformed, and the hydrogen gas is obtained. The fuel gas chiefly containing the hydrogen gas is supplied to the anodes (not shown).

The air supplied to the heat exchanger 34 moves along the heat exchanger 34, and the air is heated to a predetermined temperature by heat exchange with the exhaust gas as described later. The air heated by the heat exchanger 34 flows into the fuel cell stack 32, and the air is supplied to the cathodes (not shown).

Thus, in each of the electrolyte electrode assemblies 26, by electrochemical reactions of the fuel gas and the air, power generation is performed. The hot exhaust gas (several hundred ° C.) discharged to the outer circumferential region of each of the electrolyte electrode assemblies 26 flows through the heat exchanger 34, and heat exchange with the air is carried out. The air is heated to a predetermined temperature, and the temperature of the exhaust gas is decreased. The exhaust gas is supplied to the evaporator 36 to evaporate the water. After the exhaust gas passes through the evaporator 36, the exhaust gas is supplied from the main exhaust gas pipe 42 to the condenser 14 through the exhaust gas pipe 40.

Figure 4:
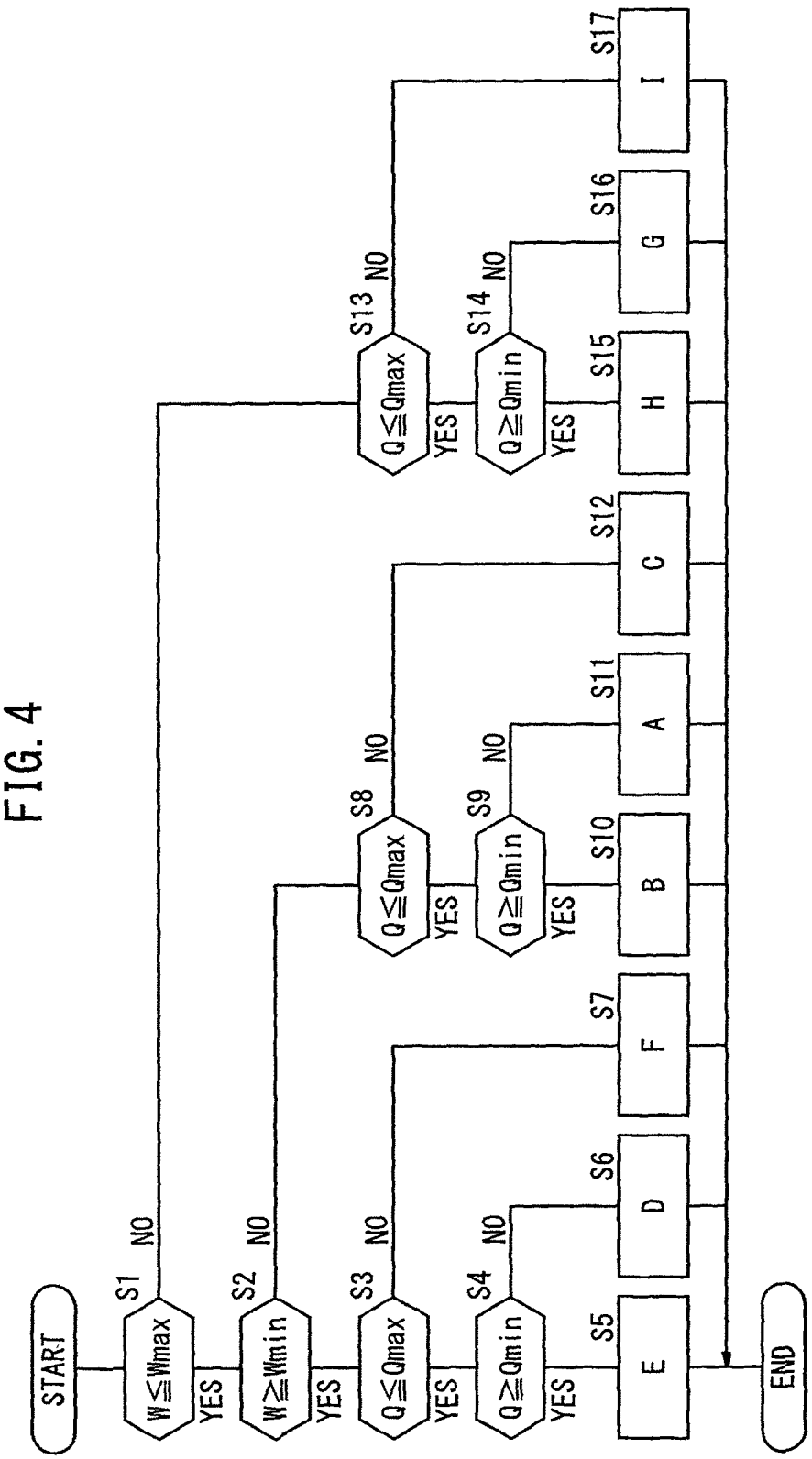
FIG. 4 is a flow chart showing a control method of the fuel cell system.

Next, a control method according to the first embodiment in the condenser 14 will be described with reference to a flow chart shown in FIG. 4 and a control map shown in FIG. 5.

Firstly, as a demanded electrical power range for the electrical power W supplied from the fuel cell module 12, a demanded upper limit electrical power Wmax and a demanded lower limit electrical power Wmin are determined. Further, as a demanded heat quantity range for the supplied heat quantity Q, a demanded upper limit heat quantity Qmax and a demanded lower limit heat quantity Qmin are determined.

In FIG. 5, the "ELECTRICITY MODE" means a mode for increasing or decreasing the amount of heat energy collected as electrical energy by the thermoelectric converter 60. Specifically, the flow rate of the exhaust gas supplied into the air cooling condenser 44 is increased or decreased. In contrast, "HEAT MODE" is a mode for increasing or decreasing the amount of heat energy of the exhaust gas collected as heat energy of hot water. Specifically, the flow rate of the exhaust gas supplied into the water cooling condenser 46 is increased or decreased.

In FIG. 5, "OTHER" indicates a situation where the supplied electrical power W exceeds the demanded electrical power range and the supplied heat quantity Q exceeds the demanded heat quantity range. In the control in this situation, the output is decreased, and electricity is transmitted to the power system.

In the control device 16, the supplied electrical power W is compared with the predetermined demanded electrical power range by the electrical power comparator 70. If it is determined that the supplied electrical power W is the demanded upper limit electrical power Wmax or less (YES in step S1), the routine proceeds to step S2.

In step S2, if it is determined that the supplied electrical power W is the demanded lower limit electrical power Wmin or more (YES in step S2), the routine proceeds to step S3 for comparing the supplied heat quantity Q of the fuel cell module 12 with the demanded heat quantity range by the heat quantity comparator 72. If it is determined that the supplied heat quantity Q is the demanded upper limit heat quantity Qmax or less (YES in step S3), the routine proceeds to step S4.

In step S4, if it is determined that the supplied heat quantity Q is the demanded lower limit heat quantity Qmin or more (YES in step S4), the routine proceeds to step S5 to perform a process E. That is, the supplied electrical power W of the fuel cell module 12 is within the demanded electrical power range, and the supplied heat quantity Q of the fuel cell module 12 is within the demanded heat quantity range. At this time, the flow rate of the exhaust gas supplied into the air cooling condenser 44 is maintained, and the flow rate of the exhaust gas supplied to the water cooling condenser 46 is maintained. Thus, the supplied electrical power W and the supplied heat quantity Q are maintained.

Further, in step S4, if it is determined that the supplied heat quantity Q is less than the demanded lower limit heat quantity Qmin (NO in step S4), the routine proceeds to step S6 to perform a process D. In this process D, the flow rate of the exhaust gas supplied into the air cooling condenser 44 is maintained, and the flow rate of the exhaust gas supplied to the water cooling condenser 46 is increased. Thus, the supplied electrical power W is maintained, and since the amount of the heat energy of the exhaust gas collected as the heat energy of the hot water is increased, the supplied heat quantity Q is increased.

Further, in step S3, if it is determined that the supplied heat quantity Q exceeds the demanded upper limit heat quantity Qmax (NO in step S3), the routine proceeds to step S7 to perform a process F. In the process F, the flow rate of the exhaust gas supplied into the air cooling condenser 44 is maintained, and the flow rate of the exhaust gas supplied to the water cooling condenser 46 is decreased. Thus, the supplied electrical power W is maintained, and since the amount of heat energy of the exhaust gas collected as heat energy of hot water is decreased, the supplied heat quantity Q is decreased.

In step S2, if it is determined that the supplied electrical power W is less than the demanded lower limit electrical power Wmin (NO in step S2), the routine proceeds to step S8 for determining whether the supplied heat quantity Q is the demanded upper limit heat quantity Qmax or less. If it is determined that supplied heat quantity Q is the demanded upper limit heat quantity Qmax or less (YES in step S8), the routine proceeds to step S9.

In step S9, if it is determined that the supplied heat quantity Q is the demanded lower limit heat quantity Qmin or more (YES in step S9), the routine proceeds to step S10 to perform a process B. In the process B, the flow rate of the exhaust gas supplied into the air cooling condenser 44 is increased, and the flow rate of the exhaust gas supplied into the water cooling condenser 46 is maintained.

Figure 6:
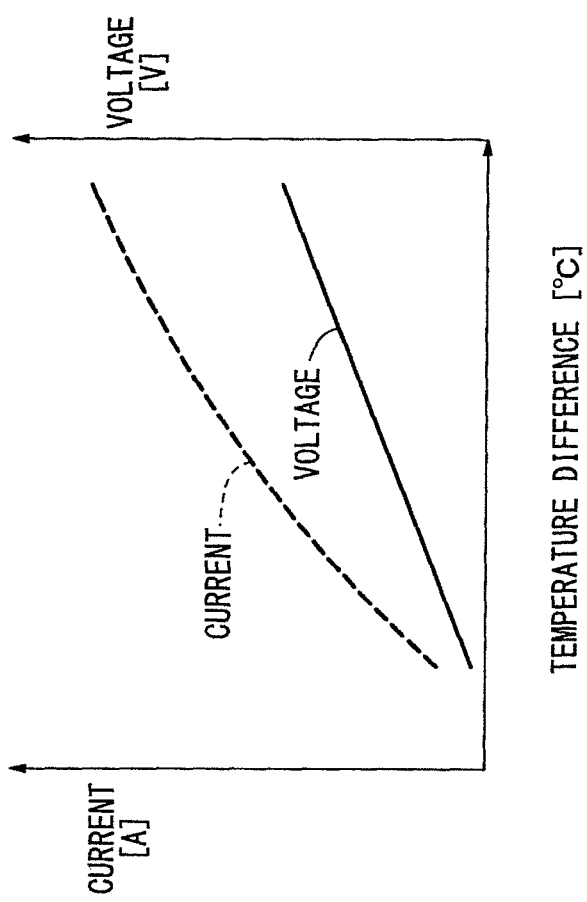
FIG. 6 is a graph showing the relationship between the temperature difference among thermoelectric conversion elements and the output.

As shown in FIGS. 2 and 3, the temperature difference between both ends of the thermoelectric conversion elements 64 attached between the outer surface 44a of the air cooling condenser 44 and the air flow pipe 62 is increased. As shown in FIG. 6, as the increase in the temperature difference between both ends of the thermoelectric conversion elements 64, the outputted electrical power is increased, and the amount of heat energy of the exhaust gas collected as electrical energy is increased as the increase in the flow rate of the exhaust gas flowing inside the air cooling condenser 44 on the high temperature side. Thus, the supplied electrical power W is increased, and the supplied heat quantity Q is maintained.

In step S9, if it is determined that the supplied heat quantity Q is less than the demanded lower limit heat quantity Qmin (NO in step S9), the routine proceeds to step S11 to perform a process A. In the process A, the flow rate of the exhaust gas supplied into the air cooling condenser 44 is increased, and the flow rate of the exhaust gas supplied to the water cooling condenser 46 is increased. Therefore, the supplied electrical power W and the supplied heat quantity Q are increased.

Further, in step S8, if it is determined that the supplied heat quantity Q exceeds the demanded upper limit heat quantity Qmax (NO in step S8), the routine proceeds to step S12 to perform a process C. In the process C, the flow rate of the exhaust gas supplied into the air cooling condenser 44 is increased, and the flow rate of the exhaust gas supplied to the water cooling condenser 46 is decreased. Thus, the supplied electrical power W is increased, and the supplied heat quantity Q is decreased.

Further, in step S1, if it is determined that the supplied electrical power W exceeds the demanded upper limit electrical power Wmax (NO in step S1), the routine proceeds to step S13. In step S13, if it is determined that the supplied heat quantity Q is the demanded upper limit heat quantity Qmax or less (YES in step S13), the routine proceeds to step S14. In step S14, if it is determined that the supplied heat quantity Q is the demanded lower limit heat quantity Qmin or more (YES in step S14), the routine proceeds to step S15 to perform a process H.

In the process H, the supplied electrical power W of the fuel cell module 12 exceeds the demanded upper limit electrical power Wmax, and the supplied heat quantity Q of the fuel cell module 12 is within the demanded heat quantity range. At this time, the flow rate of the exhaust gas supplied into the air cooling condenser 44 is decreased, and the flow rate of the exhaust gas supplied to the water cooling condenser 46 is maintained. Thus, the supplied electrical power W is decreased, and the supplied heat quantity Q is maintained.

In step S14, if it is determined that the supplied heat quantity Q is less than the demanded lower limit heat quantity Qmin (NO in step S14), the routine proceeds to step S16 to perform a process G. In the process G, the flow rate of the exhaust gas supplied into the air cooling condenser 44 is decreased, and the flow rate of the exhaust gas supplied to the water cooling condenser 46 is increased. Thus, the supplied electrical power W is decreased, and the supplied heat quantity Q is increased.

In step S13, if it is determined that the supplied heat quantity Q exceeds the demanded upper limit heat quantity Qmax (NO in step S13), the routine proceeds to step S17 to perform a process I. That is, the supplied electrical power W of the fuel cell module 12 exceeds the demanded upper limit electrical power Wmax, and the supplied heat quantity Q of the fuel cell module 12 exceeds the demanded upper limit heat quantity Qmax.

Thus, in the control of the process I, the output is decreased, and electrical energy is transmitted to the power system. The output is decreased by decreasing the flow rate of the fuel gas and the flow rate of the oxygen-containing gas supplied to the fuel cell module 12. The supplied electrical power W can be consumed by supplying electrical power to locations requiring electrical power through the power system.

In the first embodiment, the condenser 14 includes the air cooling condenser 44 using the oxygen-containing gas as the coolant. The air cooling condenser 44 includes the thermoelectric converter 60 for performing thermoelectric conversion by the temperature difference between the exhaust gas and the oxygen-containing gas. The thermoelectric converter 60 includes the thermoelectric conversion elements 64 attached between the air cooling condenser 44 on the high temperature side and the air flow pipe 62 on the low temperature side.

Thus, as shown in FIGS. 2 and 3, the temperature difference (heat energy) between the exhaust gas flowing through the air cooling condenser 44 and the oxygen-containing gas flowing through the air flow pipe 62 can be collected as electrical energy, and improvement in the power generation efficiency is achieved effectively.

Further, the temperature of the exhaust gas is decreased, and it becomes possible to condense the water vapor in the exhaust gas to collect the condensed water. Thus, generation of waste heat is suppressed, and water self-sustaining operation is facilitated. Further, since the temperature of the oxygen-containing gas is increased, thermally self-sustaining operation is facilitated easily.

Water self-sustaining operation herein means operation where the entire amount of water required for operating the fuel cell system 10 is supplied within the fuel cell system 10, without supplying additional water from the outside. Thermally self-sustaining operation herein means operation where the entire amount of heat quantity required for operating the fuel cell system 10 is supplied within the fuel cell system 10, and where the operating temperature of the fuel cell system 10 is maintained using only heat energy generated in the fuel cell system 10, without supplying additional heat from the outside.

Further, the fuel cell system 10 includes the hot water tank 18 for storing hot water, and the condenser 14 includes the water cooling condenser 46 using the hot water stored in the hot water tank 18 as the coolant. In the structure, the heat energy of the exhaust gas can be collected in the hot water tank 18, and improvement in the energy efficiency is achieved. Further, the temperature of the exhaust gas is decreased, and it becomes possible to condense the water vapor in the exhaust gas to collect the condensed water. Thus, generation of waste heat is suppressed, and water self-sustaining operation is facilitated.

In this manner, since the air cooling condenser 44 and the water cooling condenser 46 are selectively used, or used in combination, the heat energy of the exhaust gas can be collected efficiently. Thus, water self-sustaining operation is achieved, and the temperature of the exhaust gas is decreased. Further, the demanded electrical power can be supplied reliably without being affected by the power generation output regardless of the state of the hot water, i.e., the amount of the stored hot water.

Further, since operation of the fuel cell module 12 does not rely on the capacity of the hot water tank 18, the fuel cell module 12 can be started and stopped less frequently, or as few times as possible. Thus, improvement in the power generation efficiency is achieved easily.

Further, the control device 16 at least includes the electrical power comparator 70 for comparing supplied electrical power W and the predetermined demanded electrical power range, and the heat quantity comparator 72 for comparing the supplied heat quantity Q with the predetermined demanded heat quantity range.

Therefore, by the air cooling condenser 44 and the water cooling condenser 46, the heat energy can be collected from the exhaust gas. Thus, water self-sustaining operation is achieved, and the temperature of the exhaust gas is decreased. Further, the demanded electrical power can be supplied reliably without being affected by the power generation output regardless of the state of the hot water, i.e., the amount of the stored hot water.

Further, the hot water tank 18 includes the water level meter 80 for detecting the water level of the stored hot water, and the thermometer 82 for detecting the temperature of the stored hot water. Thus, the state of the stored hot water, i.e., the amount (water level) of the stored hot water and the temperature of the stored hot water can be detected reliably.

Further, the condenser 14 includes the water container 54 for storing the condensed water and the water level meter 84 for detecting the water level of the condensed water in the water container 54. Thus, the state of the condensed water, i.e., the amount of the condensed water can be detected reliably.

Further, the fuel cell system 10 includes the regulator valve 48 for regulating the flow rate of the exhaust gas supplied to the air cooling condenser 44 and the flow rate of the exhaust gas supplied to the water cooling condenser 46. Thus, the amount of the exhaust gas supplied to the air cooling condenser 44 and the amount of the exhaust gas supplied to the water cooling condenser 46 can be regulated suitably. Accordingly, water self-sustaining operation is facilitated, and the electrical power required for the load can be supplied. Further, the temperature of the stored hot water can be maintained.

Further, the fuel cell module 12 includes the fuel cell stack 32, the heat exchanger 34, the evaporator 36, and the reformer 38. Thus, in particular, the present invention is optimally applicable to the fuel cell module 12 performing steam reforming.

Further, the fuel cell module 12 is a solid oxide fuel cell (SOFC) module. Thus, the fuel cell module 12 is optimally used in fuel cell systems operated at high temperature.

Figure 7:
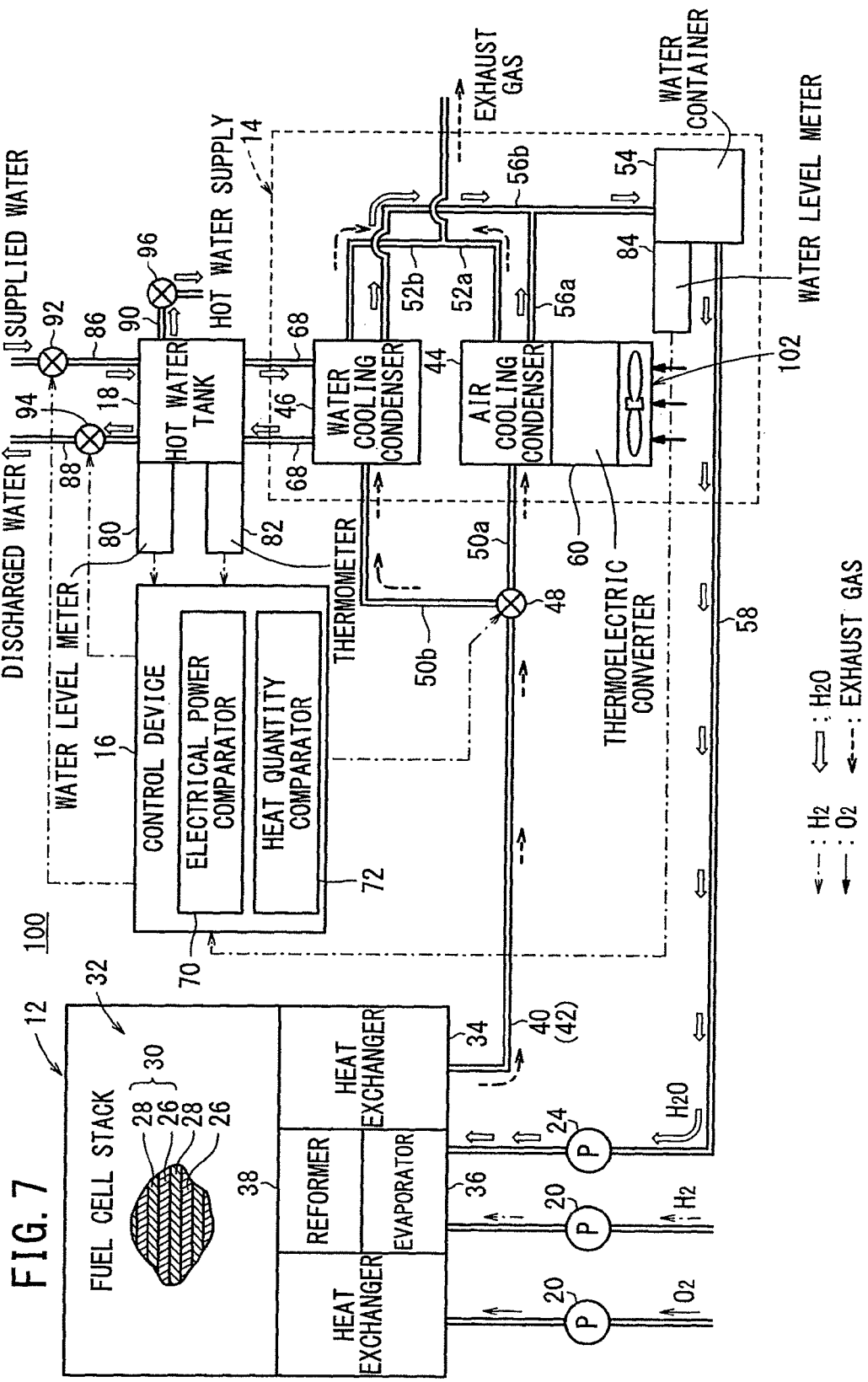
FIG. 7 is a diagram schematically showing structure of a fuel cell system according to a second embodiment of the present invention.

FIG. 7 is a diagram schematically showing a fuel cell system 100 according to a second embodiment of the present invention.

The constituent elements that are identical to those of the fuel cell system 10 according to the first embodiment are labeled with the same reference numeral, and description thereof will be omitted.

Figure 8:
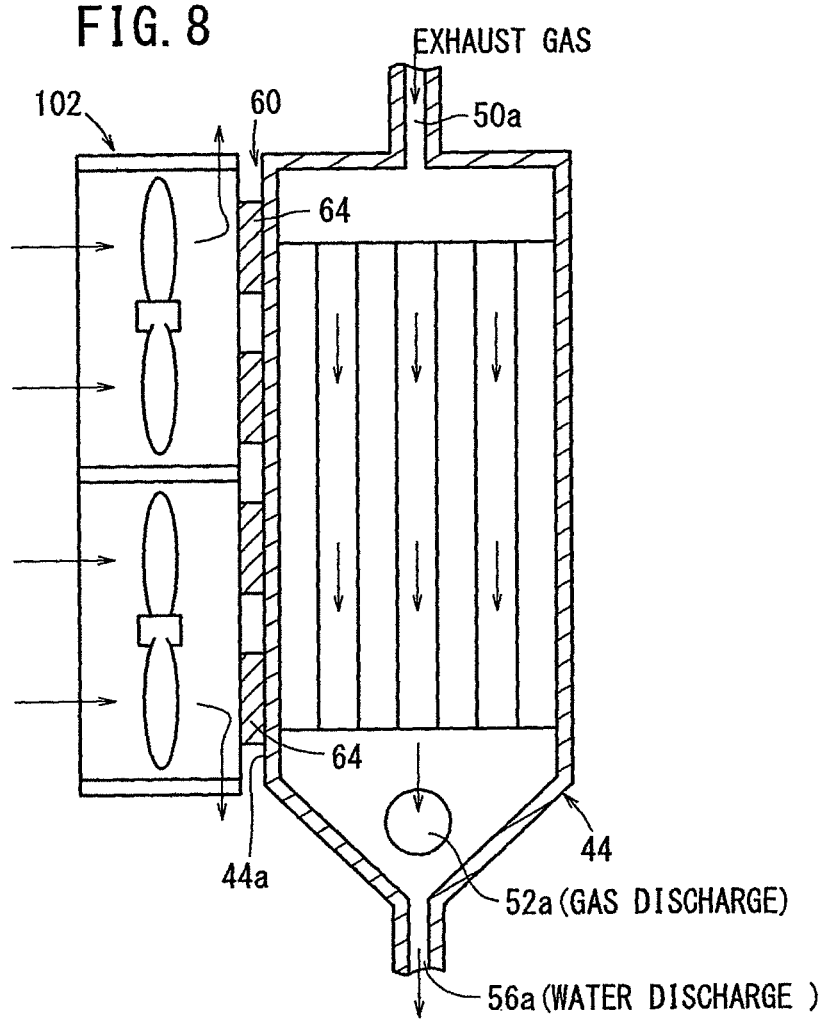
FIG. 8 is a cross sectional view showing a thermoelectric converter of the fuel cell system.
Figure 9:
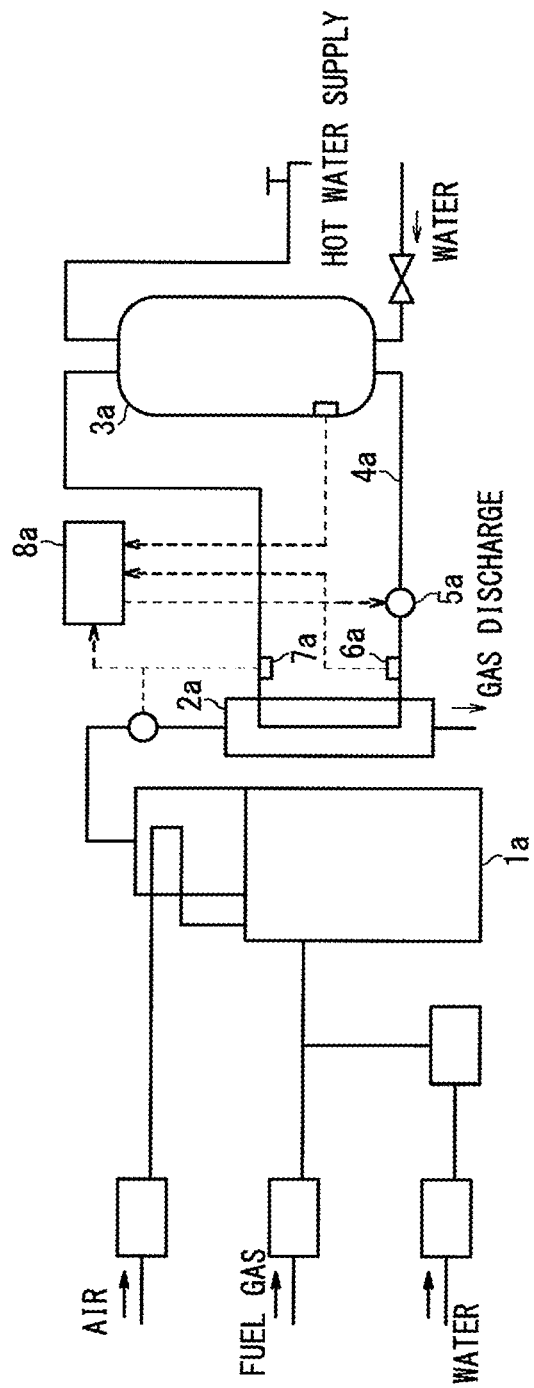
FIG. 9 is a diagram showing a fuel cell system according to the conventional technique 1.
Figure 10:
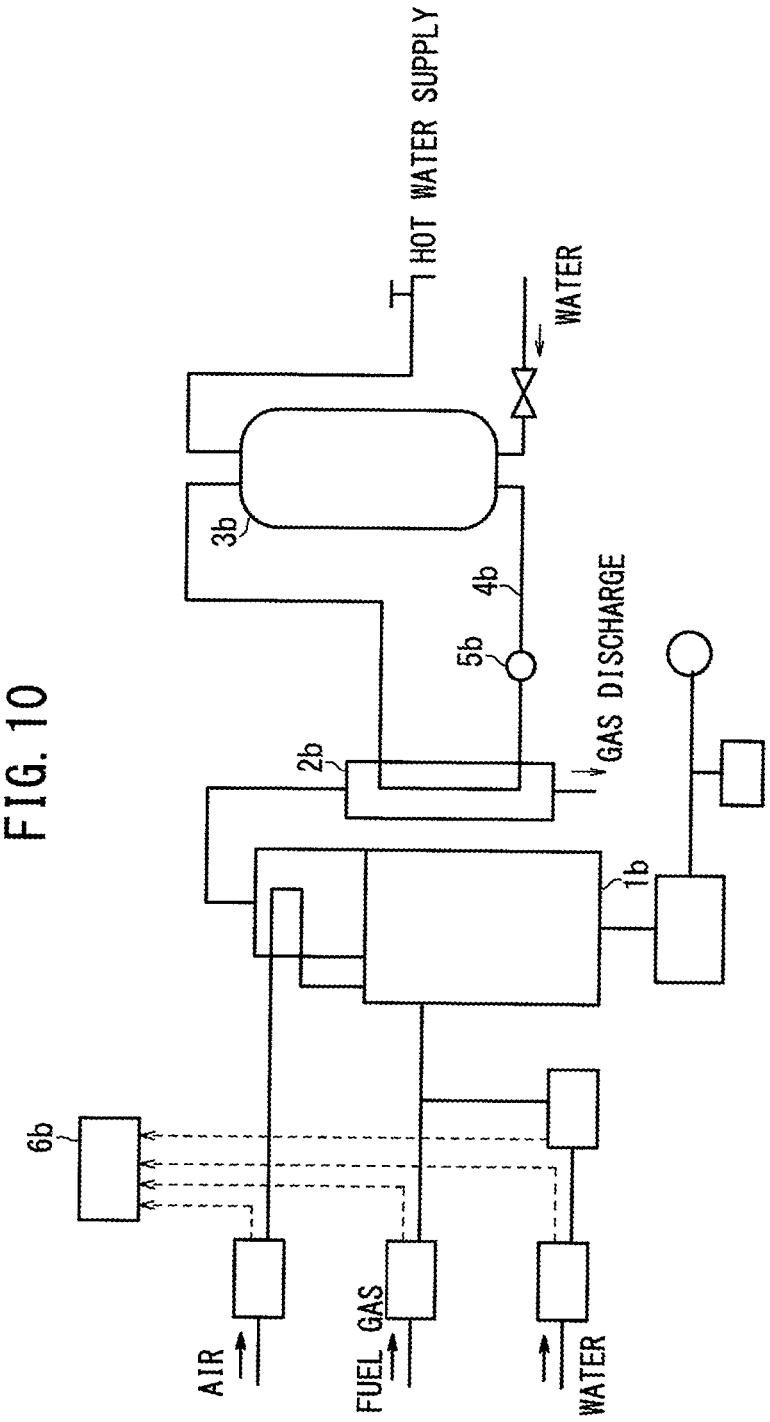
FIG. 10 is a diagram showing a fuel cell system according to the conventional technique 2.
Figure 11:
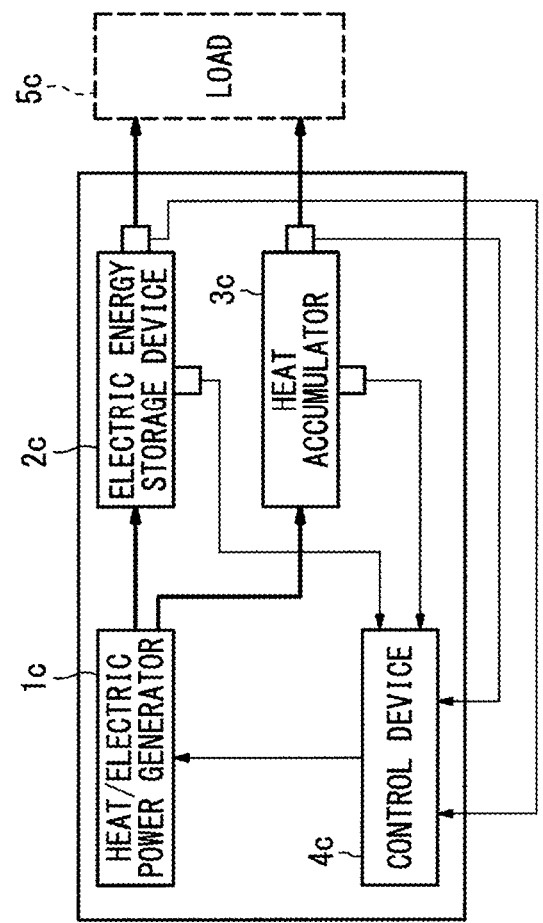
FIG. 11 is a diagram showing a heat/electric power cogenerating device according to the conventional technique 4.

As shown in FIG. 8, the fuel cell system 100 includes one or more, e.g., two air cooling fans 102 attached on the outer surface 44a of the air cooling condenser 44. A plurality of thermoelectric conversion elements 64 of a thermoelectric converter 60 are interposed between the outer surface 44a of the air cooling condenser 44 and the air cooling fans 102.

Thus, in the air cooling condenser 44, the external air (oxygen-containing gas) forcibly supplied from the air cooling fans 102 cools the exhaust gas discharged from the fuel cell stack 32, and the temperature difference among the thermoelectric conversion elements 64 can be generated.

In this manner, in the second embodiment, the same advantages as in the case of the first embodiment are obtained. For example, heat energy of the exhaust gas flowing through the air cooling condenser 44 can be collected suitably as electrical energy, and improvement in the power generation efficiency is achieved.

Although certain embodiments of the present invention have been shown and described in detail, it should be understood that various changes and modifications may be made to the embodiments without departing from the scope of the invention as set forth in the appended claims.

The invention claimed is:

1. A fuel cell system comprising:
a fuel cell module for generating electrical energy by electrochemical reactions of a fuel gas and an oxygen-containing gas; and
a condenser for condensing water vapor in an exhaust gas discharged from the fuel cell module by heat exchange between the exhaust gas and a coolant to collect the condensed water and supplying the collected condensed water to the fuel cell module;
a hot water storage unit for storing hot water;
a control device; and
a regulator valve,
wherein the condenser includes
an air cooling condensing mechanism using the oxygen-containing gas as the coolant; and
a water cooling condensing mechanism using the hot water stored in the hot water storage unit as the coolant,
the air cooling condensing mechanism includes
a thermoelectric converter for performing thermoelectric conversion by a temperature difference between the exhaust gas and the oxygen-containing gas,
the hot water storage unit includes
a hot water level detector for detecting a water level of the hot water; and
a hot water temperature detector for detecting a temperature of the hot water,
the regulator valve is configured to separately regulate a flow rate of the exhaust gas supplied to the air cooling condensing mechanism and a flow rate of the exhaust gas supplied to the water cooling condensing mechanism,
the control device includes
an electrical power comparator for at least comparing supplied electrical power with a predetermined demanded electrical power range; and
a heat quantity comparator for comparing supplied heat quantity with a predetermined demanded heat quantity range,
wherein the control device controls the regulator valve based on a result from the electrical power comparator and a result from the heat quantity comparator obtained after the result from the electrical power comparator.

2. The fuel cell system according to claim 1, wherein the condenser includes a water container for storing the condensed water and a condensed water level detector for detecting a water level of the condensed water in the water container.

3. The fuel cell system according to claim 1, further comprising a fuel cell stack formed by stacking a plurality of fuel cells, the fuel cells each including an electrolyte electrode assembly and a separator stacked together, the electrolyte electrode assembly including an anode, a cathode, and an electrolyte interposed between the anode and the cathode;
a heat exchanger for heating an oxygen-containing gas before the oxygen-containing gas is supplied to the fuel cell stack;
an evaporator for evaporating water to produce a mixed fuel of water vapor and a raw fuel chiefly containing hydrocarbon; and
a reformer for reforming the mixed fuel to produce the fuel gas.

4. The fuel cell system according to claim 1, wherein the fuel cell module is a solid oxide fuel cell module.

* * * * *